United States Patent
Suzuki

(10) Patent No.: US 7,140,272 B2
(45) Date of Patent: Nov. 28, 2006

(54) ASSEMBLY TYPE CRANKSHAFT

(75) Inventor: Tatsuo Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 511 days.

(21) Appl. No.: 10/661,644

(22) Filed: Sep. 15, 2003

(65) Prior Publication Data
US 2004/0099088 A1  May 27, 2004

(30) Foreign Application Priority Data
Sep. 30, 2002  (JP)  ............... 2002-285203

(51) Int. Cl.
*F16C 3/04*  (2006.01)
*B23P 17/00*  (2006.01)

(52) U.S. Cl. .................. 74/595; 74/597; 29/888.08

(58) Field of Classification Search ................. 74/595, 74/597; 29/888.08; *F16C 3/10, 3/04; B23P 17/00*
See application file for complete search history.

(56) References Cited

U.S. PATENT DOCUMENTS

| | | | | |
|---|---|---|---|---|
| 1,783,825 A | * | 12/1930 | Brown et al. ................. | 74/595 |
| 1,950,009 A | * | 3/1934 | Newman ...................... | 74/595 |
| 2,364,109 A | * | 12/1944 | Taylor .......................... | 74/597 |
| 2,471,982 A | * | 5/1949 | Shulda ......................... | 74/597 |
| 3,147,638 A | * | 9/1964 | Rice ............................. | 74/595 |
| 4,546,670 A | * | 10/1985 | Gaspardo ..................... | 74/595 |
| 5,009,124 A | * | 4/1991 | Beaurepaire et al. ......... | 74/595 |
| 5,207,120 A | * | 5/1993 | Arnold et al. ................ | 74/595 |

FOREIGN PATENT DOCUMENTS

EP  0 491 222 A1  * 12/1991
JP  60037411 A  2/1985

OTHER PUBLICATIONS

PTO: 2006-3875, US Patent & Trademark Office, Translation of Nakajima et al. (JP 60-37411) dated May 4, 2006.*

* cited by examiner

*Primary Examiner*—Vinh T. Luong
(74) *Attorney, Agent, or Firm*—Birch, Stewart, Kolasch & Birch, LLP

(57) ABSTRACT

In an assembly type crankshaft, a press-in plug member for assembly of its crank pin is set to be shorter than the width of the crank web, allowing the press-in force of the plug member to be reduced and the weight of the crank pin into which the plug member is pressed to be reduced. The crank pin of the crankshaft and the crank web, that have been fabricated as separate members, are made integral with each other by pressing the crank pin into a pin hole formed in the crank web. As a result, the crankshaft is assembled. Thus, after the assembly, the plug member whose length is shorter than the width of the crank web is pressed in, a firm crankshaft can be obtained. Further, since the plug member employed has a cross-sectional shape that is elliptical or oval-shaped, the above-described press-in can be performed more firmly.

10 Claims, 3 Drawing Sheets

FIG. 3
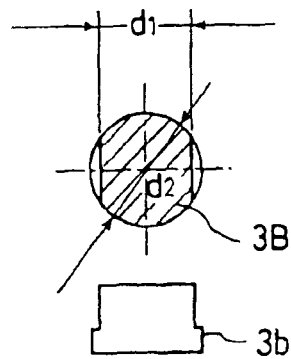
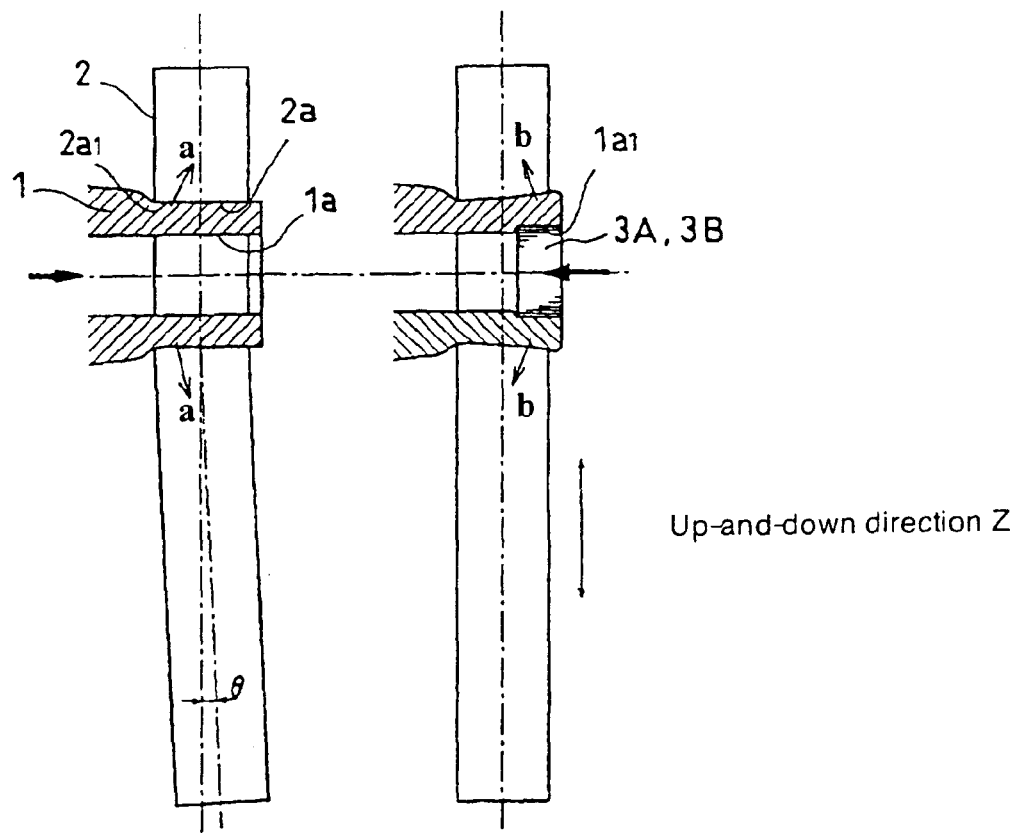
FIG. 4(a)   FIG. 4(b)

ASSEMBLY TYPE CRANKSHAFT

CROSS-REFERENCE TO RELATED APPLICATION

The present application claims priority under 35 U.S.C. §119 to Japanese Patent Application No. 2002-285203, filed Sep. 30, 2002, the entire contents of which are hereby incorporated by reference.

BACKGROUND OF THE INVENTION

1. Field of the Invention

The present invention relates to an assembly type crankshaft, and more particularly to the assembly type crankshaft to be assembled by pressing a crank pin of a crankshaft and into a crank web of the crankshaft.

2. Description of Background Art

In a conventional assembly type crankshaft to be assembled by pressing a hollow crank pin into a pair of crankshafts (crankshaft webs) held to oppose to each other, the hollow crank pin has been incorporated in advance with a part such as a connecting rod. The above-described both crankshafts (crankshaft webs) are moved to be closer to each other to thereby press the hollow crank pin comparatively lightly into a pin hole in the crankshaft. Thereafter, a cylindrical column-shaped piece member (plug member) having a slightly larger diameter than an inner diameter of a hollow hole of the hollow crank pin is caused to be pressed in from both sides of the hollow crank pin (See, for example, Japanese Patent Laid-Open No. 60-37411 ($1^{st}$ page and $2^{nd}$ page, FIG. 2)

The above-described conventional assembly type crankshaft described in Japanese Patent Laid-Open No. 60-37411 has a structure in which as shown in FIG. 6. Between a pair of crankshafts 02, 02 (crankshaft webs) held to oppose to each other, there is arranged a hollow crank pin 01 incorporated with a part such as a connecting rod 04 in advance. The above-described both crankshafts 02, 02 are moved to be closer to each other to thereby press both ends of the hollow crank pin 01 comparatively lightly into pin holes 02a, 02a in the crankshafts 02, 02. Then, after the pressing-in has been completed, a cylindrical column-shaped piece member 03, 03 having a slightly larger diameter than an inner diameter of a hollow hole 01a of the crank pin 01 is pressed in from both sides of the hollow crank pin 01.

In the conventional assembly type crankshaft to be assembled by the above-described press-in, the pressing of the hollow crank pin into a pin hole in the crankshaft has been performed by means of comparatively light fitting. As such, a press-in allowance has been made to become relatively small, whereby in an assembly stage due to the press-in, the arrangement has been made in such a manner that a deformation of the crankshaft due to the assembly is confined to a minimum. After the assembly, the piece member (plug member) is pressed into the hollow hole in the hollow crank pin from its both ends, whereby the outer diameter of the hollow crank pin is bulged out to impart required surface pressure to the inner peripheral surface of the pin hole in the crankshaft, resulting in a crankshaft having a firm fixed state.

According to the above-described assembly structure, since substantial fixing of the assembly type crankshaft due to pressing-in depends on surface pressure to an inner peripheral surface of a pin hole in the crankshaft to be imparted by the piece member (plug member) which is pressed into the hollow portion of the hollow crank pin, it is necessary that the piece member (plug member) has a predetermined length in order to impart the sufficient surface pressure.

In large-sized types of engines, however, the rigidity of their crank pins is generally high, and in such a state, pressing of the piece member (plug member) into the hollow hole of the hollow crank pin in the assembly, that is, pressing of the long piece member into the hollow hole becomes considerably difficult because of excessive press-in load. Thus, since the excessive press-in load brings about press-in deformation of the assembly type crankshaft, a process of correcting the deformation is generally required, thus deteriorating the productivity.

Further in a four-stroke cycle engine, since the pin hole in the crankshaft is to be used as a passage of lubricating oil, the use of the long piece member causes a problem in setting the passage for the lubricating oil.

Also, the use of the long piece member increases the weight of the crank pin, and the increase in the weight of the crank pin increases the counterweight, resulting in an increase in stress in the engine during the engine driving, and an increase in vibrations during high-speed rotation of the engine.

Thus, appropriate measures for solving the above-described problems in the conventional assembly type crankshaft are desired, but in fact, until the development of the present invention, a good plan had not been found.

SUMMARY AND OBJECTS OF THE INVENTION

The present invention concerns an improved structure in the assembly type crankshaft for solving the problems, especially for improving productivity in assembly of the assembly type crankshaft, and an improved structure of the crankshaft viewed from a point of view of an improved plug member in assembly of the crank pin in the crankshaft. The present invention provides an assembly type crankshaft which includes: a crank pin of a crankshaft and at least one crank web of the crankshaft which have been fabricated as separate members. These separate members are integrally assembled and formed by pressing the crank pin into the pin hole provided in the crank web. The crank pin is made into a hollow member, and after the crank pin is pressed into the pin hole provided in the crank web with an ordinary press-in allowance, the plug member having predetermined length, shorter than the thickness of the crank web, is pressed into an end portion of the hollow hole in the crank pin. This causes the crank web to be bent and deformed in the up-and-down direction thereof.

According to a first aspect of the invention, an assembly type crankshaft includes: a crank pin of a crankshaft and at least one crank web of the crankshaft which have been fabricated as separate members. These separate members are assembled together by pressing the crank pin into a pin hole provided in the crank web. The crank pin is made into a hollow member, and after the crank pin is pressed into a pin hole provided in the crank web with an ordinary press-in allowance, a plug member having predetermined length, shorter than the thickness of the crank web is pressed into an end portion of the hollow hole in the crank pin. This causes the crank web to be bent and to be deformed in the up-and-down direction thereof.

Therefore, pressing of the crank pin into the pin hole in the crank web is performed sufficiently firmly by means of that press-in allowance; the length of the plug member can be made significantly shorter is the case with conventional plug members. Since the press-in load when the plug member is pressed in is reduced, it becomes easier to press in the plug member. In addition, since the press-in load during that press-in is comparatively small, the deformation in the crankshaft due to the press-in is restricted. Therefore, an assembly type crankshaft with high productivity can be obtained, and the plug presents no obstacle in setting an oil passage for lubrication because of the plug being short in length.

According to a second aspect of the invention, since the predetermined length of the plug member to be pressed into the end portion of the hollow hole in the crank pin is equal to or smaller than substantially one half of the thickness of the crank web, a press-in load required for pressing the plug member in is reduced; it is easy to press the plug member in; and deformation in the crankshaft due to the press-in is restricted. Also, the plug member presents no obstacle in setting an oil passage for lubrication. Further, since an increase in the weight of the crank pin is restricted, an increase in the counterweight is restricted; and any increase in vibrations during high-speed rotation of the engine and the like can be also restricted.

According to a third aspect of the invention, the plug member to be pressed into the end portion of the hollow hole in the crank pin is shaped like a non-circular shape. Thus, the crank pin has a direction of a major axis and a direction of a minor axis in its cross-sectional shape, and the press-in is performed in a manner such that the direction of the major axis in the cross-sectional shape coincides with the up-and-down direction of the crank web. As a result, the deformation of the crank web occurred when the crank pin has been pressed in is corrected by press-in of the plug member. Further, since press-in of the plug member bulges out and deforms the crank pin in the up-and-down direction of the crank web, a slip inhibiting force in a press-in portion of the crank pin into the crank web is increased to dissolve occurrence of a relative slip between both in the press-in portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view showing a cross-sectional shape of another plug member to be employed in the present invention;

FIG. 4 is a view for explaining an operation due to press in of a plug member to be employed in the present invention;

DETAILED DESCRIPTION OF THE PREFERRED EMBODIMENTS

With reference to the drawings, the description will be made of embodiments of the present invention.

Figure 1:
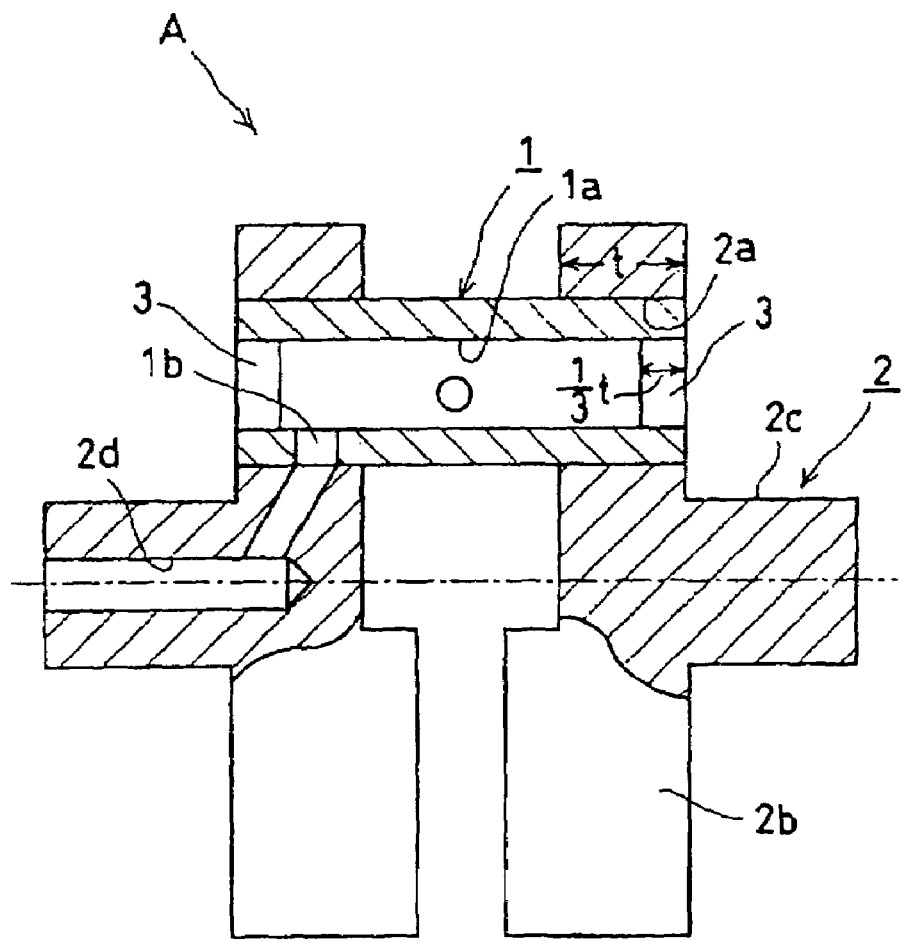
FIG. 1 is a view showing an assembly type crankshaft according to the present invention, and a state of the crankshaft after assembly.

In FIG. 1, the crankshaft A is composed of a crank pin 1 and a crank web 2. The crank pin 1 has predetermined outer diameter and length, and is constituted as a hollow member with predetermined wall thickness having a hollow hole 1a having also a passage portion 1b for lubricating oil.

Also, the crank web 2 has counterweight 2b and a journal 2c, and is further provided with a pin hole 2a, into which a crank pin 1 constituted by the hollow member is pressed. The pin hole 2a has an inner diameter smaller than an outer diameter of the crank pin 1 constituted by the hollow member, and a predetermined press-in allowance, that is, a press-in allowance to be normally adopted is to be given. It has also a passage 2d for lubricating oil.

The crank pin 1 constituted by the hollow member and the crank web 2 are fabricated as a separate member respectively and after predetermined work is performed in advance, are integrally fixed with each other by pressing in to be assembled as the crankshaft A.

The above-described assembly is summarized as below. The pair of left and right crank webs 2, 2 are arranged at a predetermined interval in advance; between the pair of crank webs 2, 2, there is arranged the crank pin 1 constituted by the hollow member in which a connecting rod and the like (not shown) have been incorporated in advance. After a predetermined centering operation and the like are performed, the pair of crank webs 2, 2 are urged so as to be closer to each other; and left and right ends of the crank pin 1 constituted by the hollow member are pressed into each of the pin holes 2a, 2a in those both crank webs 2, 2. A press-in operation for the assembly is performed by a predetermined mechanical operation.

The press-in of the crank pin 1 constituted by the hollow member into the pin hole 2a, 2a in the crank web 2, 2 is performed with a predetermined press-in allowance when the inner diameter of the pin hole 2a, 2a in the crank web 2, 2 is smaller than the outer diameter of the crank pin 1 constituted by the hollow member, and dimensional relationship between the inner diameter of the pin hole 2a, 2a and the outer diameter of the crank pin 1 constituted by the hollow member, that is, the above-described press-in allowance is set to an extent that has been normally adopted as described above.

Thus, after the press-in of the crank pin 1 constituted by the hollow member into the pin hole 2a, 2a in the crank web 2, 2 is performed and the crankshaft A is assembled, a cylindrical column-shaped plug member 3, 3, the cross-sectional shape of which is normally circular, having a predetermined outer diameter and length is pressed, as shown in FIG. 1, into the hollow hold 1a from both ends of the crank pin 1 constituted by the hollow member which is in the press-in state.

The press-in of the plug member 3 into the hollow hole 1a of the hollow crank pin 1 is performed with the following distinctive structure. In other words, in the plug member 3 to be employed for the press-in, its outer diameter is made larger than the inner diameter of the hollow hole 1a of the hollow crank pin 1 as the natural structure. The dimensional relationship between the outer diameter and the inner diameter, that is, the press-in allowance is made into a predetermined one; and the press-in allowance normally adopted may be set and it may be appropriately adjusted.

Also, the length of the plug member 3 is set to be short. In particular, the length is set to be equal to or less than substantially one half of the thickness t of the crank web 2, and is preferably set to substantially one third of the thickness t of the crank web 2 (See FIG. 1).

The length of the plug member 3 is set to be equal to or less than substantially one half of the thickness t of the crank web 2 as described above, and is more preferably set to be equal to or less than one third. The length of the plug member 3 should be set in consideration of the following points.

In other words, as described above, the press-in allowance of the crank pin 1 into the pin hole 2a in the crank web 2 is made into a normal press-in allowance, whereby fixing is performed, due to the sufficiently firm press-in which has been already performed. Also, the rigidity of the crank pin 1 is generally high, especially in large-sized types of engines, the crank pin 1 having high rigidity is employed, the use of the long plug member 3 makes the press-in load excessive, and such excessive press-in load causes deformation or the like of the crank web 2.

Further, when the length of the plug member 3 exceeds the predetermined length, it presents an obstacle in setting a passage for lubricating oil. In addition, the use of the long plug member increases the weight of the crank pin 1, resulting in an increase in the counterweight 2b and further an increase in vibrations during high-speed operation of the engine. The above-described points such as the foregoing are taken into consideration, and the length of the plug member should be set accordingly.

Figure 2:
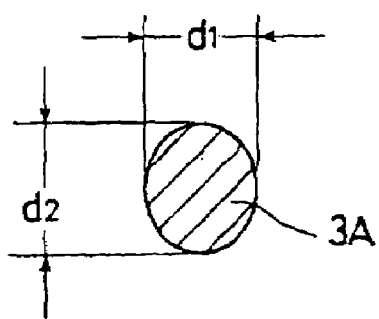
FIG. 2 is a view showing a cross-sectional shape of a plug member to be employed in the present invention.

The cross-sectional shape of the plug member 3 has been made circular as described above, but a plug member 3A, 3B the cross-sectional shape of which is elliptical or oval-shaped is preferably employed, as shown in FIG. 2 or FIG. 3.

As the plug member 3A which is elliptical in cross-sectional shape, in dimensional relationship with the inner diameter of the hollow hold 1a in the crank pin 1, as shown in FIG. 2, for example, the length of d1 in the direction of the minor axis is made substantially equal to the inner diameter of the hollow hole 1a of the crank pin 1, and the length of d2 in the direction of the major axis is set such that the press-in allowance becomes 50 to 100 μm.

Also, as the plug member 3B which is oval-shaped in cross-sectional shape in dimensional relationship with the inner diameter of the hollow hole 1a in the crank pin 1, as shown in FIG. 3, the length of d1 in the direction of the minor axis is made to be 0.5 to 1 mm, and the length of d2 in the direction of the major axis is set such that the press-in allowance becomes 50 to 100 μm. Thus, the plug member 3B has a possibility that during press-in, there occurs a clearance between the plug member 3B and the hollow hole 1a in the direction of minor axis d1. Thus, in order to prevent an oil leakage from the clearance, the plug member 3B is provided with a collar portion 3b.

In this respect, as regards the length of the plug member 3A, 3B which is elliptical or oval-shaped in cross-sectional shape, as in the case of the plug member 3 which is circular in cross-sectional shape, it is set to substantially one half of the thickness t of the crank web 2, and is preferably set to substantially one third.

Thus, the adoption of the plug member 3A, 3B which is elliptical or oval-shaped in cross-sectional shape brings about an advantageous operation for correcting deformation of the crank web 2 occurred in the press-in of the crank pin 1 into the pin hole 2a in the crank web 2, that is, such deformation into "V" character-shaped configuration of the crank web 2 occurred by the press-in into the pin hole 2a in the crank pin 1 as shown in FIGS. 4(a) and (b).

In other words, when the crank pin 1 is pressed into the pin hole 2a provided in the crank web 2 as shown in FIGS. 4(a) and (b), the inner diameter of the pin hole 2a is widen when its press-in port side $2a_1$ receives a strong urging force in a direction indicated by an arrow "a"; the press-in port side $2a_1$ of the crank pin 1 is bent in such a state as shown in FIG. 4(a) to deform the crank web 2 by an amount corresponding to an angle θ; and as a result, the crankshaft after the press-in of the crank pin 1 becomes such that the both left and right crank webs 2, 2 become deformed into "V" character-shaped configuration as a whole.

After the crank pin 1 is pressed into the pin hole 2a, the elliptical plug member 3A or the oval-shaped plug member 311 will be pressed into the end portion of the hollow hole 1a in the crank pin 1. During in the press-in of the plug member 3A or 3B into the end portion of the hollow hole 1a in the press-in operation, a longitudinal direction d2 of the plug member 3A or 3B in its cross section, that is, the elliptical or oval-shaped direction of major axis d2 is selected so as to coincide with an up-and-down direction Z of the crank web 2.

Thus, due to the above-described selection during the press-in of the plug member 3A or 3B into the hollow hole 1a (See FIG. 4(b)), on the side of direction d1 of minor axis of a cross-section of the plug member 3A or 3B, a bulging-out force which the inside of the hollow hole 1a of the crank pin 1 receives is small. In contrast, on the side of direction d2 of major axis of the cross-section, a bulging-out force which the inside of the hollow hole 1a of the crank pin 1 receives is large. Therefore, the crank web 2 becomes larger in a direction indicated by an arrow "b" by an urging force in the up-and-down direction Z, as compared with a smaller urging force in the lateral direction, especially in the up-and-down direction Z on the side of the press-in port $1a_1$ of the plug member 3A or 3B.

Therefore, due to the urging force in a direction indicated by the arrow "b" which occurs by press-in of the plug member 3A or 3B into the hollow hole 1a in the crank pin 1, the crank web 2 deformed as shown in FIG. 4(a) is deformed in a direction that the deformation is canceled and offset as shown in FIG. 4(b). As a result, the above-described deformation of the crank web 2 is corrected by the press-in of the plug member 3A or 3B into the hollow hole 1a in the crank pin 1.

Figure 5:
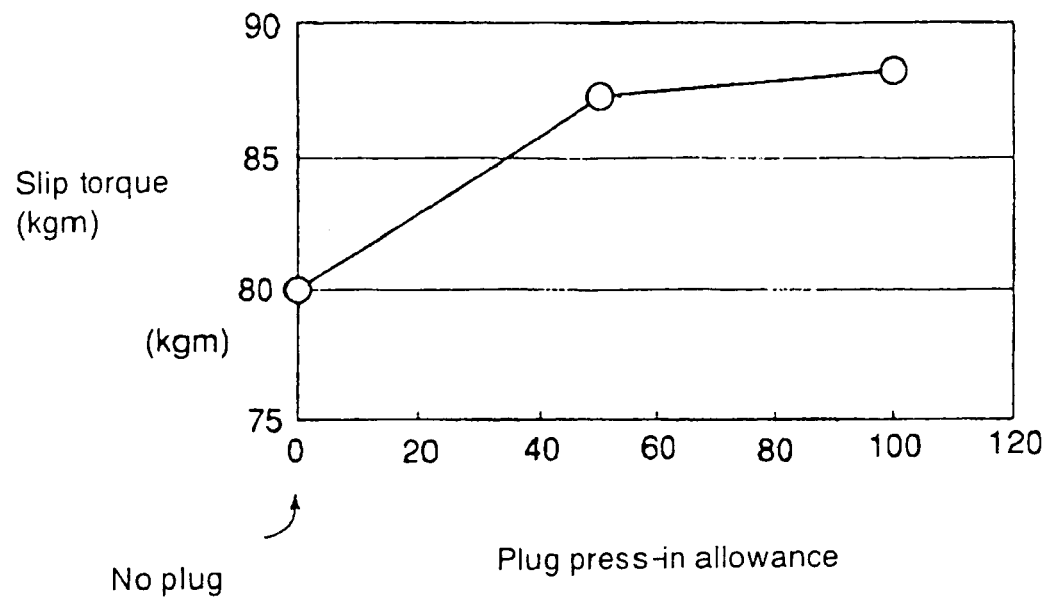
FIG. 5 is a view for showing an effect due to press in of a plug member to be employed in the present invention.
Figure 6:
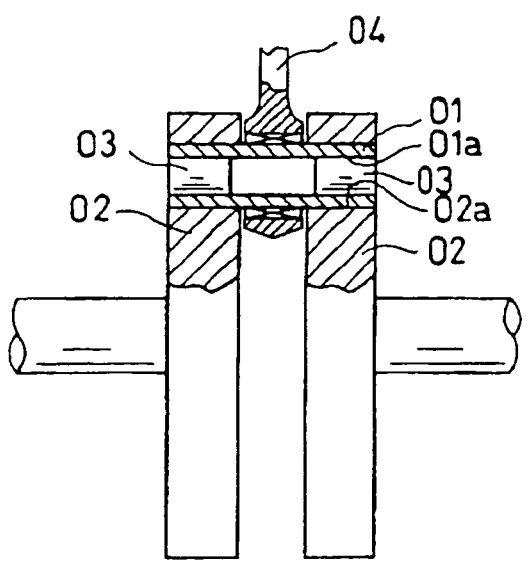
FIG. 6 is a view showing a state of a conventional assembly type crankshaft after assembly.

Also, the use of the plug member 3A or 3B which is elliptical or oval-shaped in cross-sectional shape during the press-in brings about bulge and deformation in the up-and-down direction Z to the crank pin 1, in addition to the effect of deformation and correction of the crank web 2. The bulge and deformation of the crank pin 1 exerts an operation of inhibiting a relative slip between the crank web 2 and the crank pin 1, and a slip torque characteristic as shown in FIG. 5 can be obtained. Thus, the necessity for taking a large press-in allowance for pressing the crank pin 1 in can be avoided.

Since the embodiment shown in FIGS. 1 to 5 is constructed as described above, the press-in of the crank pin 1 into the pin hole 2a in the crank web 2 is performed with a press-in allowance to be normally adopted. Therefore, the press-in is sufficiently firm, the length of the plug member 3, 3A, 3B can be made shorter than is the case in conventional configurations. Specifically, the length can be set to be equal to or less than substantially one half of the thickness of the crank web, and preferably can be set to substantially one third of the thickness of the crank web.

Also, when pressing the plug member 3, 3A, 3B into the inner end portion of the hollow hole 1a in the crank pin 1, since its press-in load is set to be comparatively small, it is easy to press in the plug member, and deformation to the crankshaft, especially the crank web due to the press-in load can be kept to a minimum.

Since the length of the plug member 3 is set to be short and the weight of the crank pin 1 is restricted to be low, the weight of the counterweight of the crank web is restrained from increasing. As a result, vibrations during high-speed rotation of the engine is restrained from increasing.

Also, as describe above, the plug member 3, the plug member 3A or 3B whose cross-sectional shape is elliptical or oval-shaped is employed and the press-in is performed with the direction d2 of major axis of the plug member 3A or 3B caused to coincide with the up-and-down direction Z of the crank web 2. As a result, deformation of the crank web 2 occurring when the crank pin 1 is pressed into the pin hole 2a in the crank web 2 is corrected by pressing the plug member 3A or 3B having the elliptical or oval-shaped cross sectional shape into the inner end portion of the hollow hole 1a in the crank pin 1, and an additional correction operation of the crankshaft after the crankshaft assembly can be precluded or reduced.

Further, the plug member 3A or 3B whose cross-sectional shape is elliptical or oval-shaped is employed, and the press-in is performed with the direction d2 of major axis of the plug member 3A or 3B caused to coincide with the up-and-down direction Z of the crank web 2, and the press-in causes the crank pin 1 to bulge out and become deformed in the up-and-down direction. Therefore, there is increased a relative anti-slip effect between the pin hole 2a in the crank web 2 which has press-in relationship with the crank pin 1 each other and the crank pin 1. Accordingly, the press-in allowance in the press-in can be set to be less.

In place of the above-described embodiment, various embodiments are conceivable.

In the above-described embodiment, the crank pin has been of a hollow member, but the crank pin may be of a solid member, and when a crank pin made of a solid member is employed, on both ends thereof, there are provided apertures for pressing the plug in.

In the above-described embodiment, the plug member has been a solid member whose cross-sectional shape is circular or elliptical, oval-shaped which is non-circular, but the present invention is not limited to the members of the above-described cross-sectional shape, but various shapes can be appropriately selected for use without departing from the gist of the invention. Members whose cross-sectional shape is oblong, polygonal, square, rectangular or the like are also selected for use.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An assembly type crankshaft, comprising:
    a crank pin of a crankshaft; and
    at least one crank web of the crankshaft, the crank pin and the at least one crank web being fabricated as separate members, to be assembled together by pressing said crank pin into a pin hole provided in said crank web,
    wherein said crank pin is formed as a hollow member, and after said crank pin is pressed into the pin hole provided in said crank web with an press in allowance, a plug member having a predetermined length, shorter than a thickness of said crank web, is pressed into an end portion of a hollow hole in said crank pin, and said crank web is bent and deformed in an up-and-down direction thereof,
    wherein said crank web is deformed in a V shape when the plug member is pressed into the end portion of the hollow hole in said crank pin.

2. The assembly type crankshaft according to claim 1, wherein the hollow hole of the crank pin has a wall with a predetermined wall thickness, the wall including a passage portion through which lubricating oil passes into the hollow hole.

3. An assembly type crankshaft,
    a crank pin of a crankshaft; and
    at least one crank web of the crankshaft, the crank pin and the at least one crank web being fabricated as separate members, to be assembled together by pressing said crank pin into a pin hole provided in said crank web,
    wherein after said crank pin is pressed into the pin hole provided in said crank web with a predetermined press-in allowance, a plug member having a predetermined length, shorter than a thickness of said crank web, is pressed into apertures provided in both ends of said crank pin, and said crank web is bent and deformed in an up-and-down direction thereof, so that when viewed from a side, the pin hole of the crank web is deformed into a V-shape.

4. The assembly type crankshaft according to claim 3, wherein said predetermined length of said plug member pressed into the apertures in the ends of said crank pin is equal to or smaller than one half of the thickness of said crank web.

5. The assembly type crankshaft according to claim 4, wherein said plug member pressed into the apertures in the ends of said crank pin has a non-circular shape and has a cross-sectional shape with a predetermined dimension d2 in a direction of a major axis and a predetermined dimension d1 in a direction of a minor axis, the direction of the major axis of said cross-sectional shape of the plug member coinciding with the up-and-down direction of said crank web.

6. The assembly type crankshaft according to claim 5, wherein a length of the cross-sectional shape in the direction of the minor axis is 0.5 to 1 mm.

7. The assembly type crankshaft according to claim 3, wherein the press-in allowance is 50 to 100 μm.

8. The assembly type crankshaft according to claim 3, wherein the plug member has an elliptical cross-sectional shape.

9. The assembly type crankshaft according to claim 3, wherein the plug member has a polygonal cross-sectional shape.

10. The assembly type crankshaft according to claim 3, wherein said predetermined length of said plug member to be pressed into the apertures in the ends of the hollow hole in said crank pin is equal to or smaller than one third of the thickness of said crank web.

* * * * *